(12) United States Patent
Ohno et al.

(10) Patent No.: US 6,700,737 B1
(45) Date of Patent: Mar. 2, 2004

(54) RECORDING AND REPRODUCING SEPARATION TYPE MAGNETIC HEAD HAVING THIN PART IN UPPER CORE OR MAGNETIC FILM AND MAGNETIC STORAGE APPARATUS USING THE SAME

(75) Inventors: Jun Ohno, Hiratsuka (JP); Takayoshi Ohtsu, Ashigarakami-gun (JP)

(73) Assignee: Hitachi Global Storage Technologies Japan, Ltd., Kanagawa-ken (JP)

(*) Notice: Subject to any disclaimer, the term of this patent is extended or adjusted under 35 U.S.C. 154(b) by 0 days.

(21) Appl. No.: 09/365,839

(22) Filed: Aug. 3, 1999

(30) Foreign Application Priority Data

Aug. 4, 1998 (JP) .......................... 10-220690

(51) Int. Cl.⁷ .............................................. G11B 5/187
(52) U.S. Cl. ...................................... 360/126; 360/319
(58) Field of Search .................. 360/317, 322, 360/121, 126, 319

(56) References Cited

U.S. PATENT DOCUMENTS

| | | | | |
|---|---|---|---|---|
| 5,805,391 A | * | 9/1998 | Chang et al. ............... 360/113 |
| 5,966,274 A | * | 10/1999 | Suzuki ....................... 360/113 |
| 6,034,847 A | * | 3/2000 | Komuro et al. ............. 360/126 |
| 6,043,959 A | * | 3/2000 | Crue et al. .................. 360/113 |
| 6,125,018 A | * | 9/2000 | Takagishi et al. ........... 360/317 |
| 6,137,652 A | * | 10/2000 | Ezaki et al. ................. 360/113 |

FOREIGN PATENT DOCUMENTS

| JP | 58-137120 | | 8/1983 |
|---|---|---|---|
| JP | 64-21709 A | * | 1/1989 |
| JP | 9-7125 | | 1/1997 |
| JP | 9-69212 | | 3/1997 |
| JP | 9-106509 | | 4/1997 |
| JP | 10-83524 A | * | 3/1998 |

\* cited by examiner

*Primary Examiner*—Jefferson Evans
(74) *Attorney, Agent, or Firm*—Mattingly, Stanger & Malur, P.C.

(57) ABSTRACT

A recording and reproducing separation type magnetic head has a recording head with an upper core and a lower core that writes information on a magnetic disk and a reproducing head with an upper magnetic film and a lower magnetic film, as sealed layers, that reads the information from the magnetic disk. A thickness of the upper part of the upper core is less than a thickness of the tip minute of the upper core. The magnetic head has excellent overwriting performance and achieves high speed transfer.

2 Claims, 10 Drawing Sheets

RECORDING AND REPRODUCING SEPARATION TYPE MAGNETIC HEAD HAVING THIN PART IN UPPER CORE OR MAGNETIC FILM AND MAGNETIC STORAGE APPARATUS USING THE SAME

BACKGROUND OF THE INVENTION

This invention concerns magnetic head and magnetic storage for magnetic disk apparatus etc., and especially, concerns the magnetic storage apparatus using magnetic head and suitable for the high frequency record.

FIG. 2(a) is a strabismus figure which shows the general recording and reproducing separation type magnetic head. Slider 7 is worn in the tip of head gimbal assembly (HGA)8. This extension strabismus figure of slider 7 is shown in FIG. 2(b). And, a typical part limits chip strabismus figure of the part (A part of FIG. 2(b)) of the recording and reproducing head are shown at FIG. 2(c). The position of air bearing surface described for the reference in each figure, because the direction of the slider was not fixed in each figure. As it is shown at. FIG. 2(c), the recording head utilizes electromagnetic induction by coil 6, and the reproducing head has magnetic sensor 4 between upper magnetic film 2 and lower magnetic film 3. At FIG. 2(c), upper magnetic film 2 and upper core 1 placed in the top, coil 6, etc. showed the condition that the right side of the figure was cut. Lead wire 5 take out the signal from magnetic sensor 4.

It is general to design the thickness of the core deeply in order to generate the more resistant magnetic field, and in order to saturate the core, for conventional record reproduction separate type magnetic head in order to ensure the overwriting performance. Upper core 1 is formed generally by plating or sputter process. From the problem on the manufacturing process, upper 1 tip minute 1a other tend to (in the following, slope 1b of upper core). Still, other part is the thickness with the same abbreviation. This is explained using FIG. 3.

Figure 3:
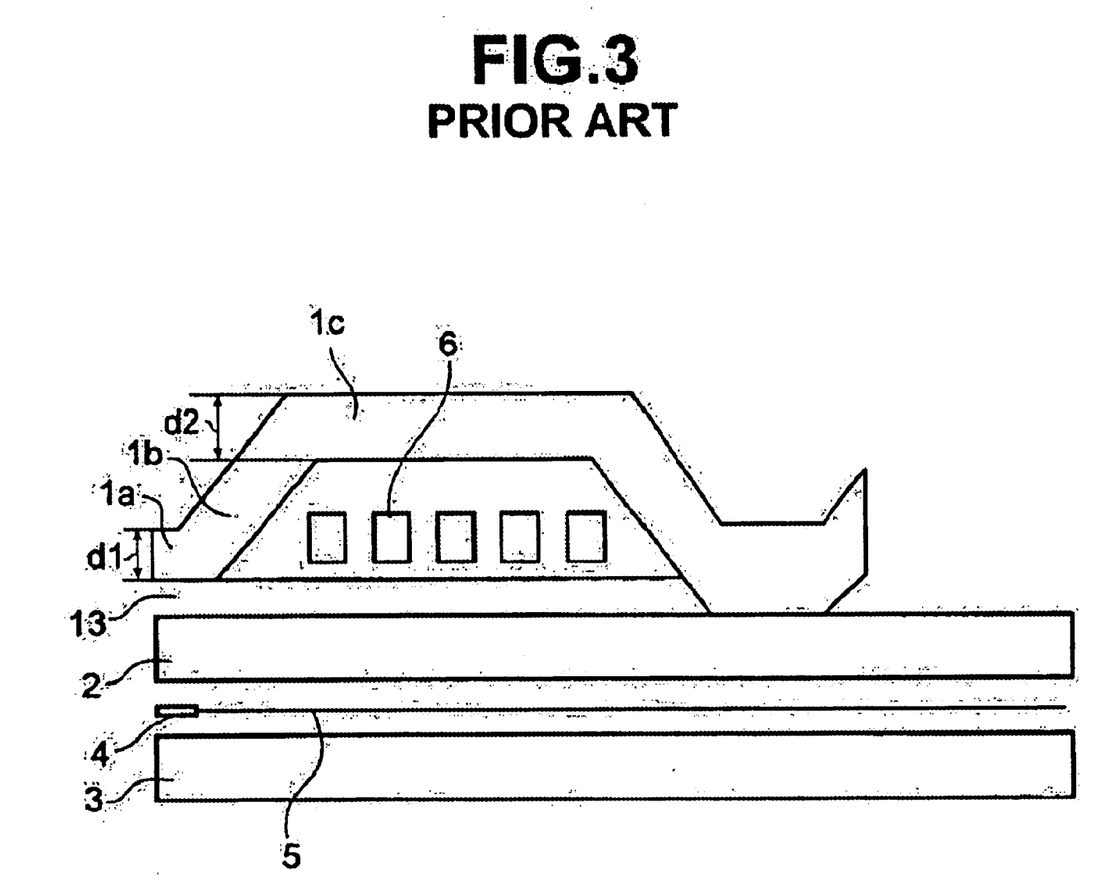
FIG. 3 is a recording head which shows conventional recording and reproducing separate type magnetic head and sectional view of the part of reproducing head.

FIG. 3 is sectional view of the part of recording and reproducing head. D1 thickness of tips minute 1a of upper core 1 and d2 thickness of coil 6 upper part 1c (the part which is almost parallel to the substrate and is not in slope 1b) of upper core 1 are almost same. In the FIG. 13 is the nonmagnetic material which forms the gap.

As a result of relating to the matter of the above mention, there is conventional technologies following. Laid-open No. 58-13712) discloses the technology that the upper core is thickened for the upper magnetic film (the lower core) in order to prevent the magnetic saturation in the part (the part which corresponds to slope 1b of said upper core) in which cross section of the core decreases most from the relationship between coverage factor. And, in the laid open 9-7125, the thickness of the magnetic yoke is ensured by joining the upper magnetic film to lower magnetic film in the part without a magnetic flux perception element in order to thin the thickness of the upper magnetic film (the lower core). And, in the laid open 9-169212, the stabilization of the record magnetic field is attempted by using double upper cores and adopting the material with the high saturation magnetic field. And, in the laid open 9-106509, by making the multilayer coil and shortening the magnetic path length, lowering impedance, the risetime of the record current is shortened.

Recently, it has been required that magnetic storages such as magnetic disk apparatus transfer data at high speed with miniaturization and capacity enlargement. With this, the magnetic head is required that the record and the regeneration in high frequency are possible. It is necessary that impedance of the head is become small and the risetime of the record current is shortened by decreasing the magnetic path length and reducing the winding number of the coil, etc. to realize high speed transfer for the high-speed writing necessary for the head. However, the problem that the magnetic field change was retarded for the change of the writing current became tangible as it becomes a high frequency, as it is insufficient only in the shortening in the current risetime,. This causes deterioration of the overwriting performance and nonlinear strain, and it becomes a reason why reliability and performance of apparatus remarkably lower.

Figure 5:
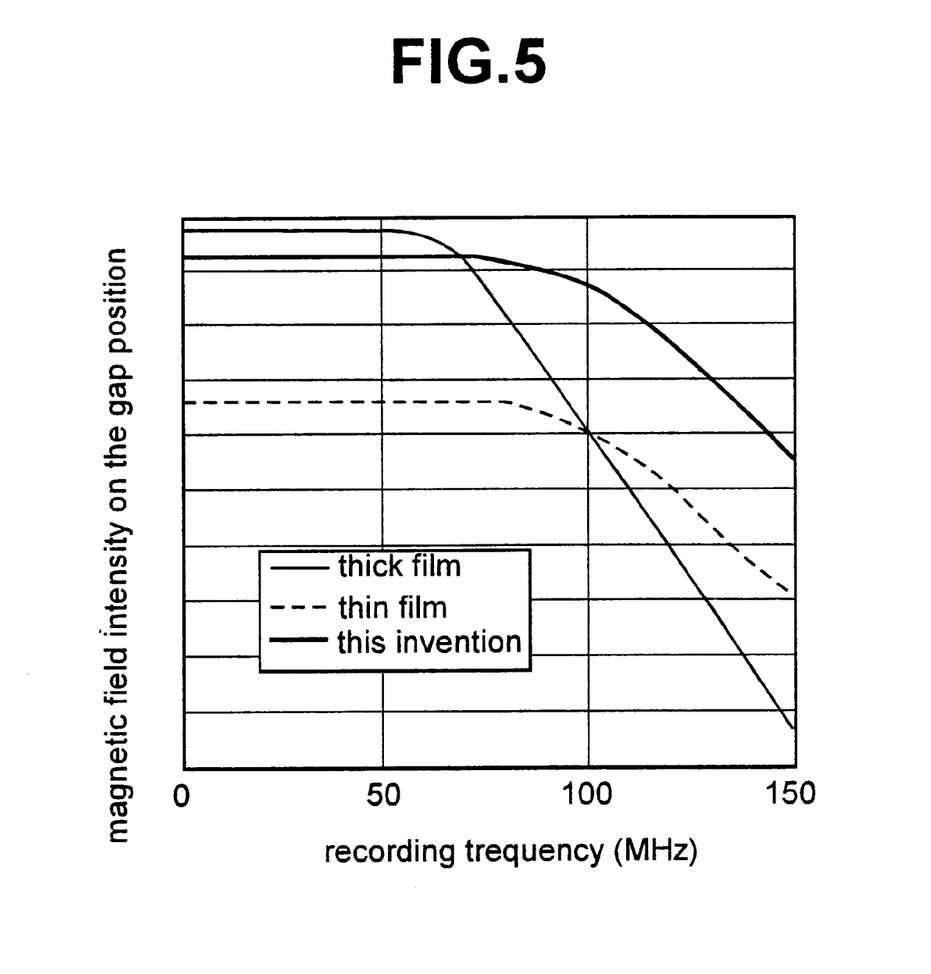
FIG. 5 shows the frequency dependence of generation magnetic field.

FIG. 5 is the graph which shows the frequency dependence of generation magnetic field, and it has shown the relationship between magnetic field strength and record frequency of the gap position. The degradation in the high frequency is big, though the magnetic head shown in FIG. 3 generates high magnetic field as show in FIG. 5 as thick film. Reversely, the quantity of generating magnetic field decreases, as it is shown in the Figure as a thin film, when the thickness of the core is thinned in order to improve characteristics in high frequency, and the overwriting performance as a necessity is not obtained.

In the laid-open No. 58-137120, the record in the high frequency is not considered, the technology has thickened the upper core for the upper magnetic film (the lower core).

And, in the laid open 9-7125 and laid open 9-69212, the record in the high frequency is not considered, either.

In the laid open 9-106509, the delay of the magnetic field for the current does not disclose.

SUMMARY OF THE INVENTION

The first purpose of this invention is to offer the magnetic head which has excellent rapid recording performance and overwriting performance which does not deteriorate in high frequency.

The second purposes of this invention are to offer the magnetic storage apparatus which is excellent in high speed transfer, and is excellent in the overwriting performance.

In order to realize above first purpose of this invention, in the magnetic head of this invention, said magnetic head has features that the thickness of the upper part of the upper core is less than the thickness of the tip minute of the upper core, or the thickness of the tip minute of upper magnetic film is thicker than the thickness of the other part of upper magnetic film or are there both of above structure.

$D1>d2$ and d2 would satisfy the condition over 10% of d1 when the thickness of the upper part of the upper core is d2 and the thickness of tip minute of upper is d1. In addition, it is desirable that d2 has range from 90% to 10% of d1 and it is more desirable from 80% to 20% range, and it is the most desirable from 70% to 30% range.

Figure 2:
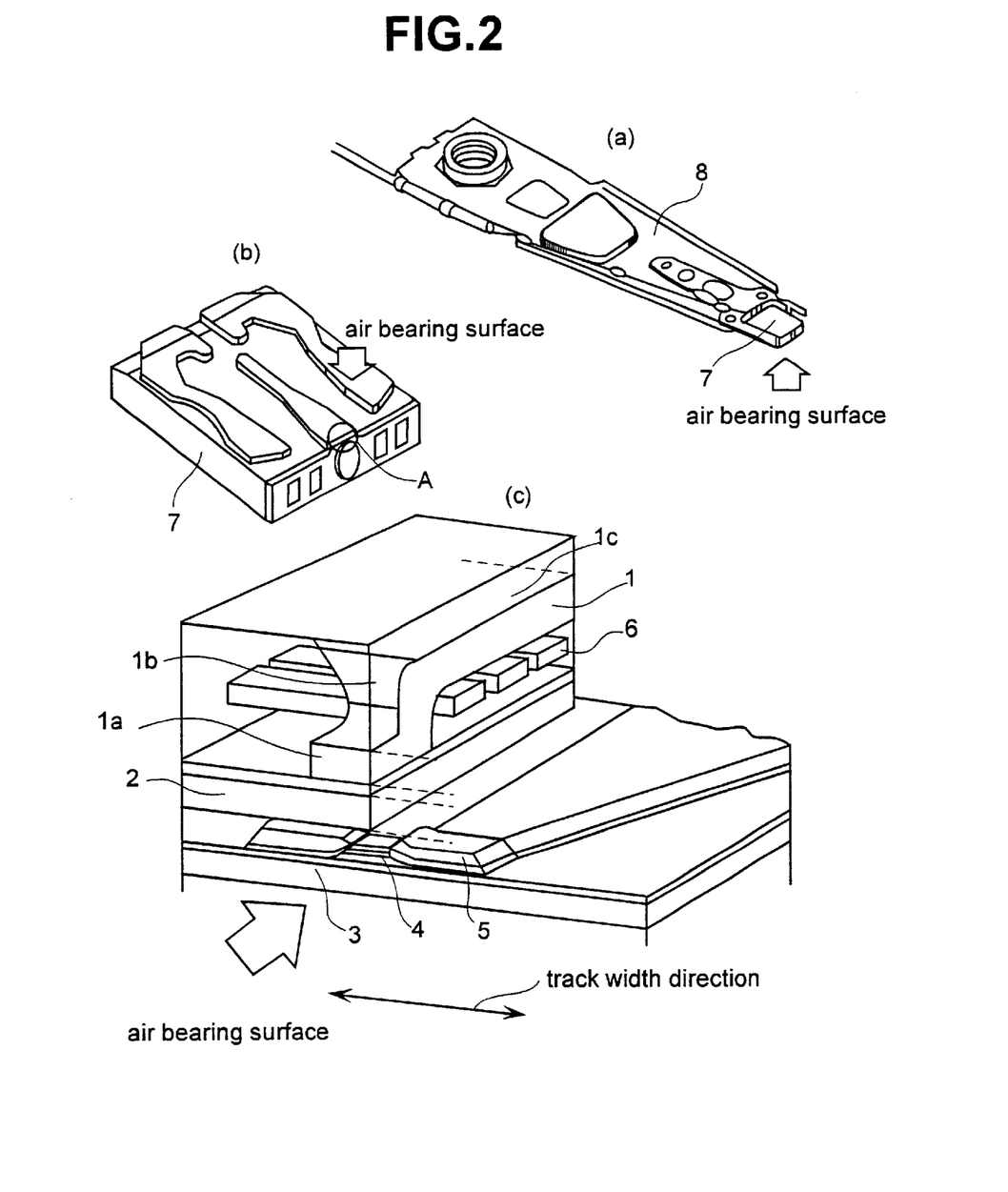
FIGS. 2(a)–2(c) show a recording and reproducing separation type magnetic head.

The thickness of the upper magnetic film is that the thickness of the part, namely the part in FIG. 2 in the lower of upper part 1c of the upper core, which faces the upper part of the upper core. This is correspondent to the part under the essential part of the abbreviation coil. The part which is connected with the upper core in the side which is reverse to the tip minute of the upper magnetic film may be thicker than it, even if the thickness is equal to the thickness of the upper magnetic film. It is central most portion of the coil, and essential part of the coil does not contain whole about $\frac{1}{10}$ in tip minute side (the left side in FIG. 8 which explains in practical example after) and the reverse side (the right side of the same Figure) of the coil. In short, the thickness of the part under about 1/10 of tip minute side of the coil and the reverse side do not become the thickness of the upper magnetic film.

D3>d4 condition is satisfied, when the thickness of the upper magnetic film is d4 and the thickness of the upper magnetic film of the part which faces for the tip minute of the upper core is d3, and d4 is over 10% of d3. In addition, d4 has desirable range from 90% to 10% of d3, and has more desirable range from 80% to 20%, and the most desirable range from 70% to 30%.

Figure 4:
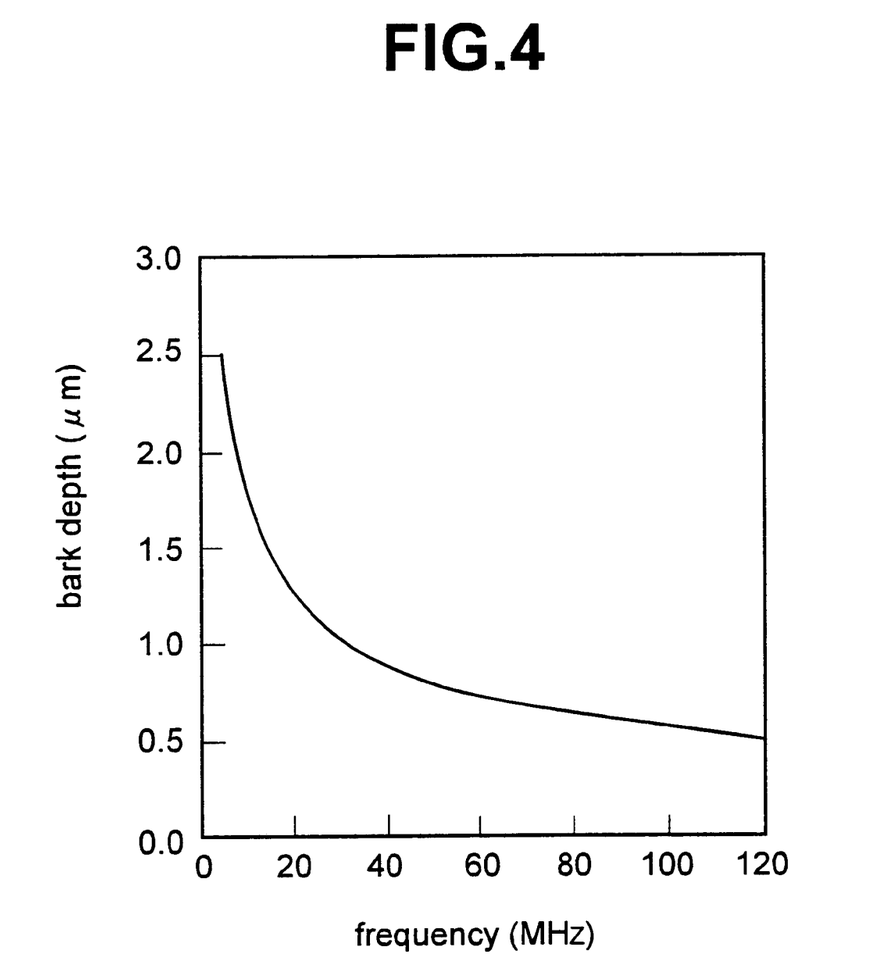
FIG. 4 shows the relationship between frequency and bark depth.

In the following, the action of this magnetic head is explained. The delay of the change of record magnetic field for the change of the record current occurs from skin effects and transfer of magnetic domain wall, generation of eddy current, etc. On these, the effect can be reduced by thinning the thickness of the core. FIG. 4 is the graph which shows example of bark effect, and it has shown the relationship between frequency and bark depth. The horizontal axis shows the frequency of the record current, and the vertical axis shows the distance from the core surface where the direction of the magnetization changes in proportion to the frequency. The material property of ferrite generally used as core material of recording head is used. In the region which exceeds 100 MHz, the direction of the magnetization for change of current follows in only the part under about 0.5 $\mu$m. That is to say, it is shown to be the region where the magnetic field of high frequency does not come out, even if the core is thickened over 1 $\mu$m.

Though degradation minute in the high frequency decreases, when the way which showed the relationship between magnetic field strength and record frequency of the gap position in advance using FIG. 5, only making the film thickness of the core to be thinned, the magnetic saturation happens in the part in which the core width narrows, and the absolute value of magnetic field strength in the gap part is not sufficiently obtained. The degradation in the high frequency increases, when the film thickness is thickened in order to prevent that. In this invention, by thinning only the part which the core does not concentrate a magnetic flux because of expanding in the track width direction, by doing the reaction for writing current which flows in the coil speedily, while the magnetic field strength of the gap part is kept, the problem of the high frequency was solved.

In order to achieve above second purpose, in the magnetic storage apparatus of this invention, A magnetic recording apparatus which comprises: a magnetic recording medium which has a recorded plane of information and rotatable; a driving means which rotates the magnetic recording medium in high speed; a slider which has a magnetic head writing information on a magnetic disk and reading information from the magnetic disk and moving in the recorded plane of said magnetic recording medium; an actuator which positions the magnetic head for the fixed position on said magnetic recording medium in the high speed; a control means for control of rotation drive of the drive means, control of the transfer of the said actuator and control of reading or writing information of said head, wherein the thickness of the tip minute of the upper magnetic film is thicker than the thickness of the other part of said upper magnetic film, and the thickness of the tip minute of the upper magnetic film is thicker than the thickness of the other part of said upper magnetic film.

DESCRIPTION OF THE EMBODIMENTS

Figure 1:
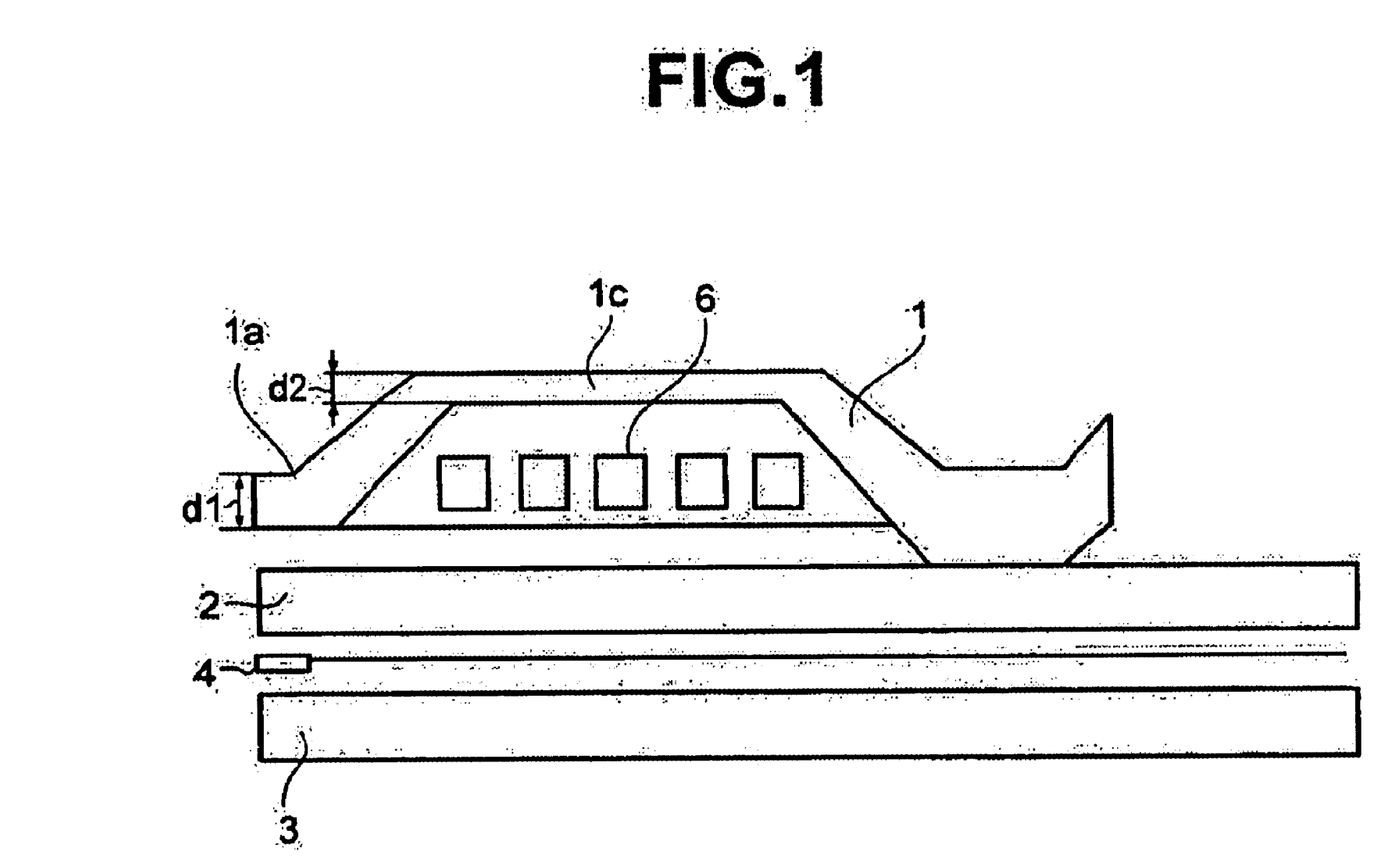
FIG. 1 is a sectional view of the part of recording and reproducing head of the magnetic head which shows one practical example of this invention.

In the following, practical example of this invention is explained using the drawing. FIG. 1 is a sectional view of the part of recording and reproducing head in the magnetic head of a practical example of the present invention. The thickness D1 of tips minute 1a of upper core 1 and the thickness d2 of upper part 1c of upper core 1 are produced so that d1>d2 and d2 may satisfy the condition over 10% of d1. In this practical example, d1 is 3.0 $\mu$m, d2 is 1.5 $\mu$m. In FIG. 5, the frequency dependence of generation magnetic field of this magnetic head is shown in comparison with the example aforesaid.

Like this, it is possible to hold the generation of the eddy current minimum and keeps near tip minute which causes the magnetic saturation to the level equal to the conventional technology, and that the direction of the magnetization according to the bark effect does not move, by thickening tips minute 1a of the upper core, and upper part 1c in which the upper core expands in the track width direction reducing the thickness. By this, the delay of magnetic field change for change of current decreases, and it is possible that magnetic field in the gap position generates no strain to the high frequency. It is similar, when the coil is also multilayer.

And, it is known that the multilayer which consists of magnetic films and nonmagnetic materials or changed magnetic material are used in order to solve the problem of the magnetic saturation. The thickness in using such multilayer may be regarded as sum of all magnetic film which works as the magnetic yoke.

FIGS. 6(a) and (b) show side-view and sectional view of recording and reproducing head in the magnetic head of another practical example of the present invention. The nose shape of the upper core in order to improve magnetic saturation, the upper core in which the approach width extends on the upper core which determines track width is placed, and it is viewed from air bearing surface, it becomes the bottom for the convex. Here, the thickness of tips minute 1a of upper core 1 is the thickness of larger cross section which is viewed from air bearing surface, that is, in this case, the thickness d1 of the part of the upper core which extends the width larger, and it is made to be the thickness which satisfies d1>d2. As example, thickness (d2) of upper part 1c is made to be 1 μm or less.

Figure 7:
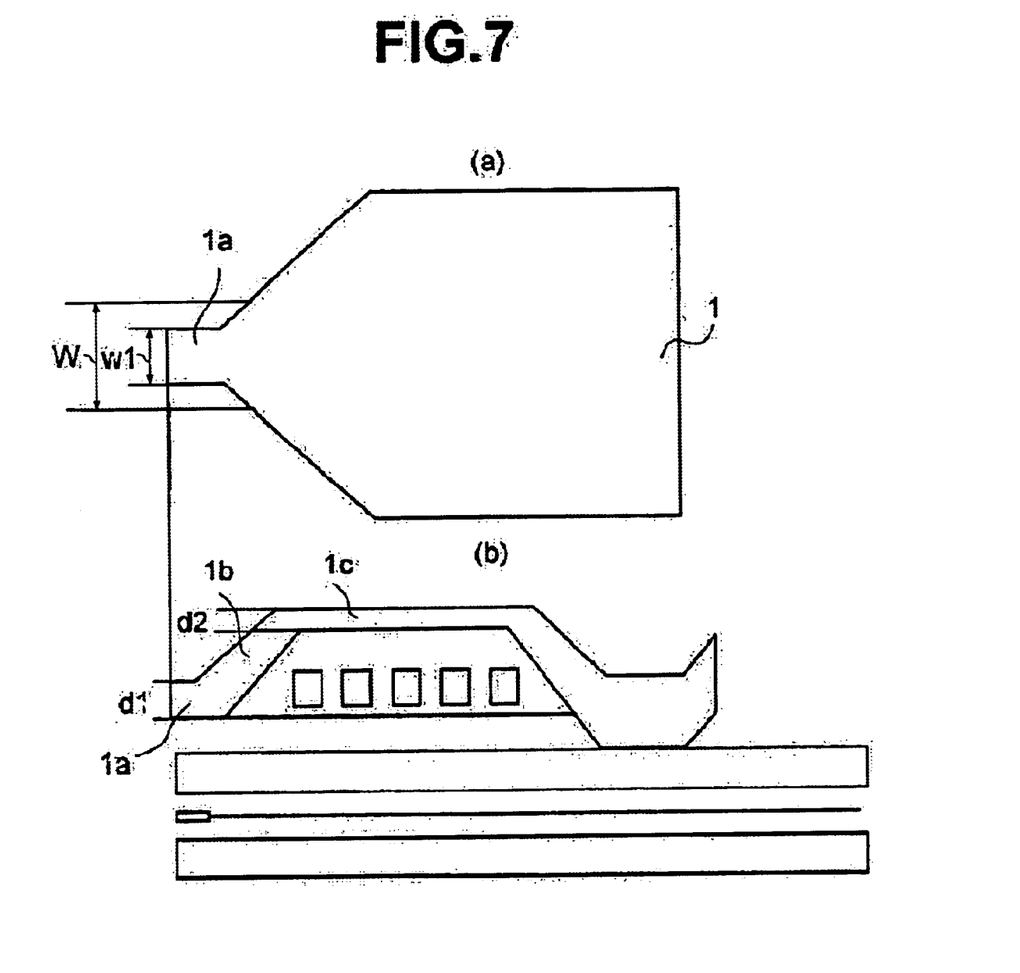
FIG. 7(a) is a plan figure of the upper core and FIG. 7(b) is a sectional view of the part of recording and reproducing head in the magnetic head of more another practical example of the present invention.

FIGS. 7(a) and (b) is a plan figure of the upper core and a sectional view of the part of recording and reproducing head in the magnetic head of more another practical example of the present invention. The thickness of the region which has satisfied W>2×W1 is made to be under ½ of the d1 thickness of tips minute 1a of upper core 1, when the dimension of the track width direction of the upper core is W, the track width from the viewpoint of air bearing surface of the upper core tip is W1. In this case, the upper part from middle part of slope 1b and the upper part 1c are thin thickness.

Figure 6:
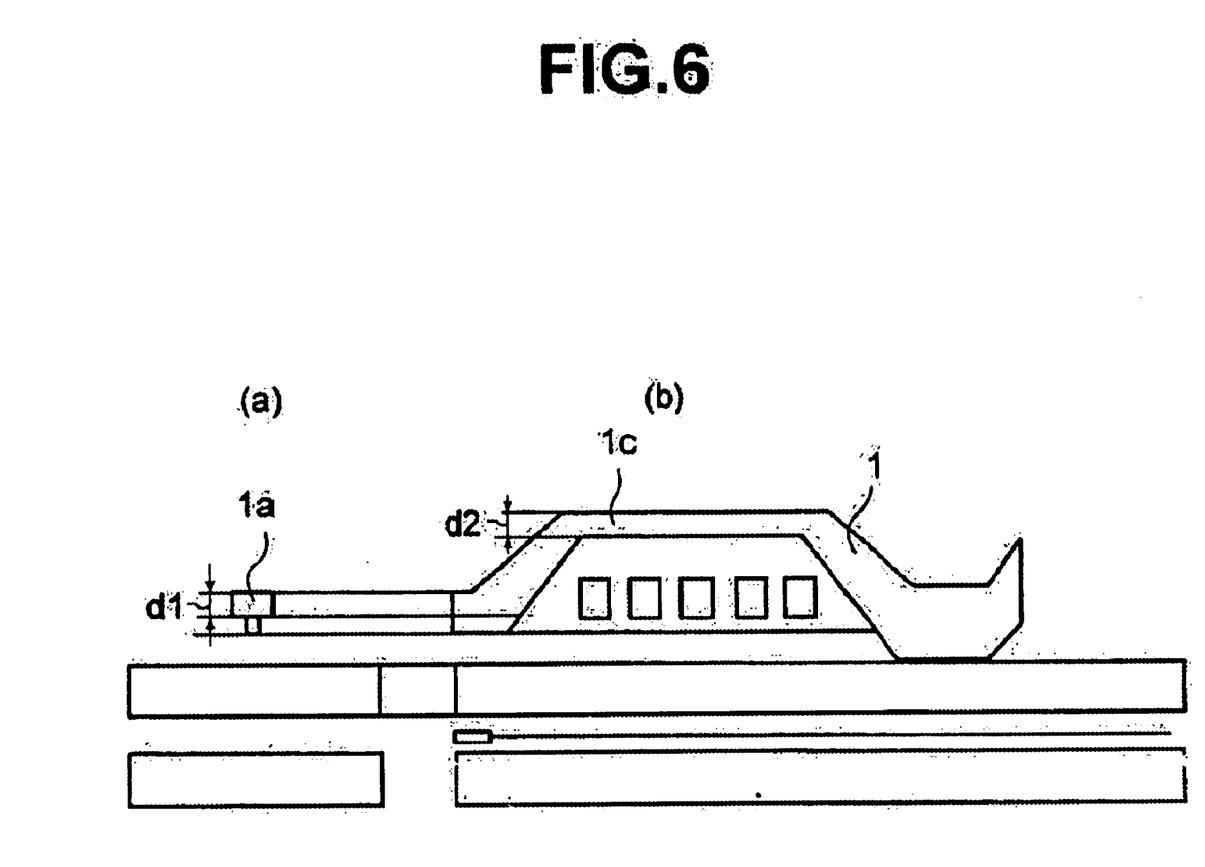
FIGS. 6(a) and 6(b) show side-view and sectional view of recording and reproducing head in the magnetic head of another practical example of the present invention.

In case that the shape has a downward convex shape from the viewpoint of air bearing surface of the upper core tip, d1 thickness of tips minute 1a therefore, track width W1 is defined as the part of the most wide width of the convex shape in proportion to definition of the upper core which showed in FIG. 6.

Figure 8:
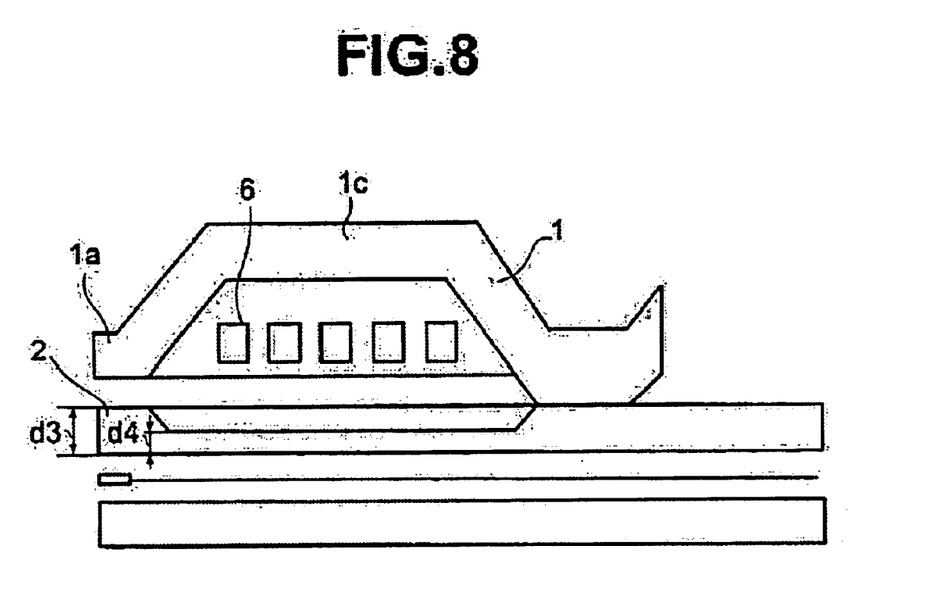
FIG. 8 is a sectional view of the part of recording and reproducing head in the magnetic head of more another practical example of the present invention.

FIG. 8 is a sectional view of the part of recording and reproducing head in the magnetic head of more another practical example of the present invention. Upper magnetic film 2 serves as a lower core, and works as a magnetism yoke. It is possible to improve characteristics in high frequency as well as the aforesaid practical example by thickening the d3 thickness of upper magnetic film 2 of the part which faces for tips minute 1a of upper core 1 each other, and satisfying d3>d4 condition for this d4 thickness of upper magnetic film 2. And, the d3 thickness is made to be 10 times or less of the d4 thickness.

D4 thickness of upper magnetic film 2 calls is the thickness of the part which faces for upper part 1c of upper core 1. This is correspondent to the part under the essential part of abbreviation coils 6. The part (right side of the figure) connecting with upper core 1 of the side which is reverse to the tip minute may be warmer or equal to the thickness d4 of upper magnetic film 2. In this practical example, it was equalized with the d3 thickness of upper magnetic film 2 of the part which faces for tips minute 1a of upper core 1. And, the essential part of coil 6 is most of the center of coil 6, and does not contain about ¹⁄₁₀ of whole each in tip minute side (way of the left of the figure) and the reverse side (right side of the figure) of coil 6. In short, the thickness of upper magnetic film 2 of the under part about ¹⁄₁₀ of left and right side of this figure may be thicker or equal to d4.

Figure 11:
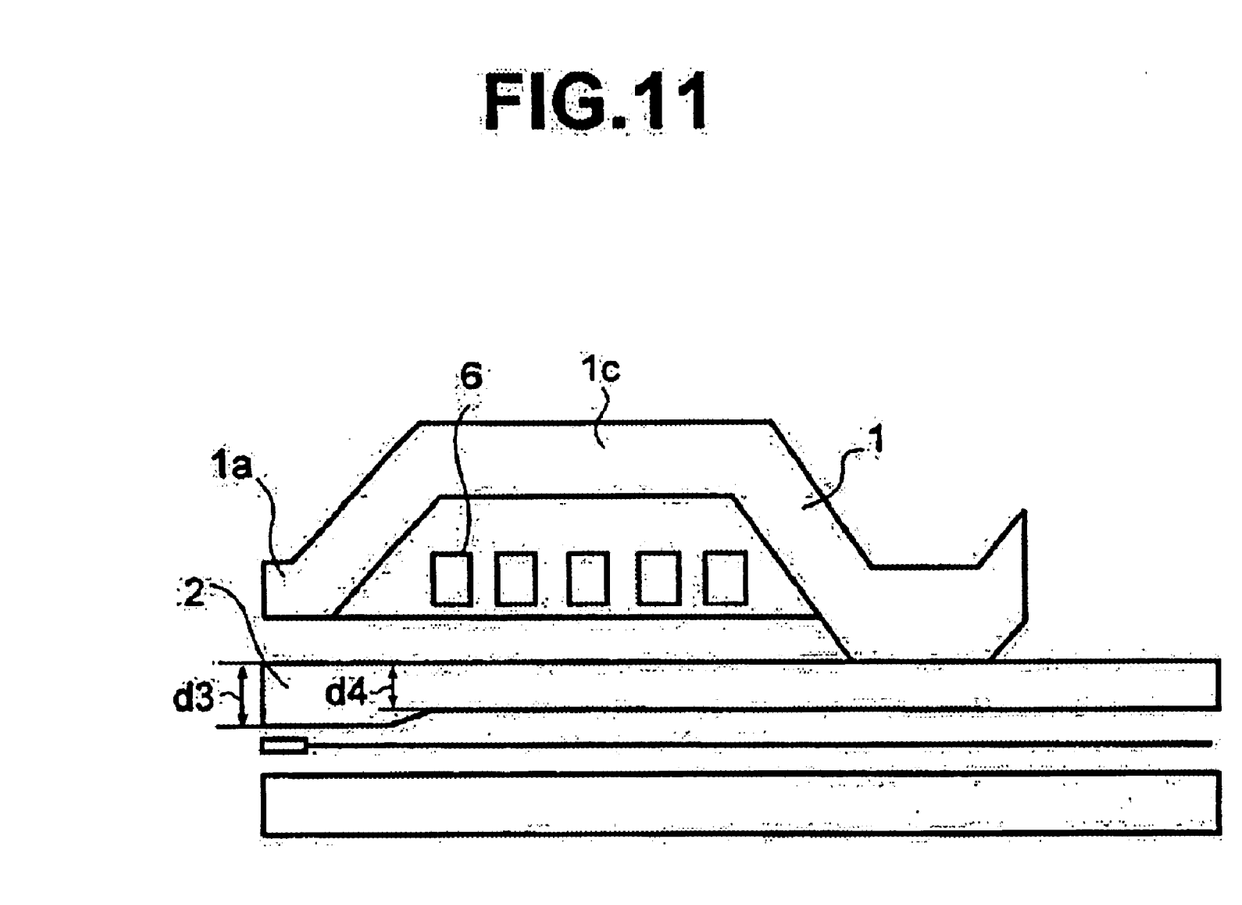
FIG. 11 is a sectional view of the part of recording and reproducing head in the magnetic head of more another practical example of the present invention.

And, d4 thickness of upper magnetic film 2 is possible to form in the form which was crowded in the underside, as shown in figures of 11, crowded in the upper surface side of upper magnetic film 2, as it is shown in figures of 8.

There is a case that the lower magnetic film part is also used as a magnetic yoke by the junction of lower magnetic film with the upper magnetic film. The thickness of the sum total of magnetic film of the part used as a magnetism yoke is thickness d4 of the above. And, there is a case that the membrane composition which separated these two functions is done with the upper magnetic film serves as a core of shield of the regeneration element and record coil. The d3 thickness of the part viewed from air bearing surface of the upper magnetic film is defined by the thickness of the magnetic film of the part which faces the upper core from the viewpoint of air bearing surface.

Figure 9:
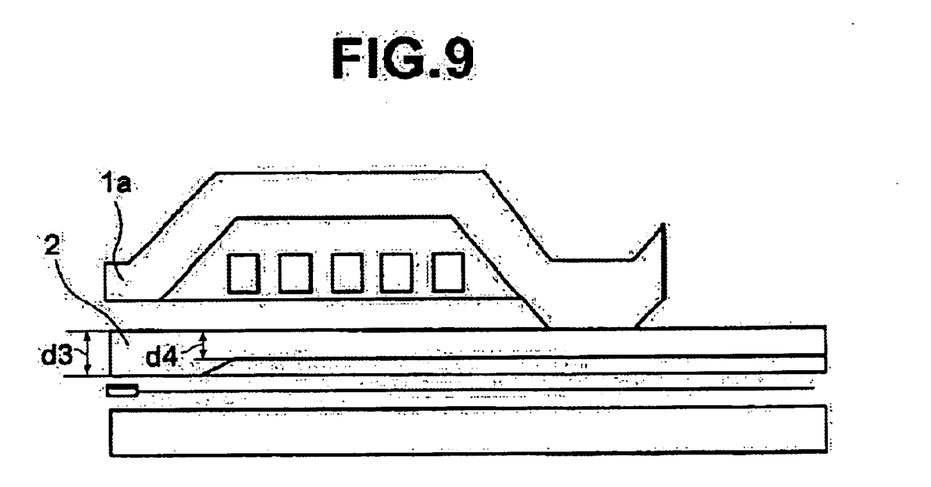
FIG. 9 is a sectional view of the part of recording and reproducing head in the magnetic head of more another practical example of the present invention.

FIG. 9 is a sectional view of the part of recording and reproducing head in the magnetic head of more another practical example of the present invention. the thickness of upper magnetic film 2 for the work of the magnetic yoke is 1 μm or less, and is over 10% of the thickness d3 of the part which faces for tips minute 1a of the upper core 1.

And, when the upper magnetic film is a multilayer, the thickness may be considered as well as the time of which the above-mentioned upper core is a multilayer.

Figure 10:
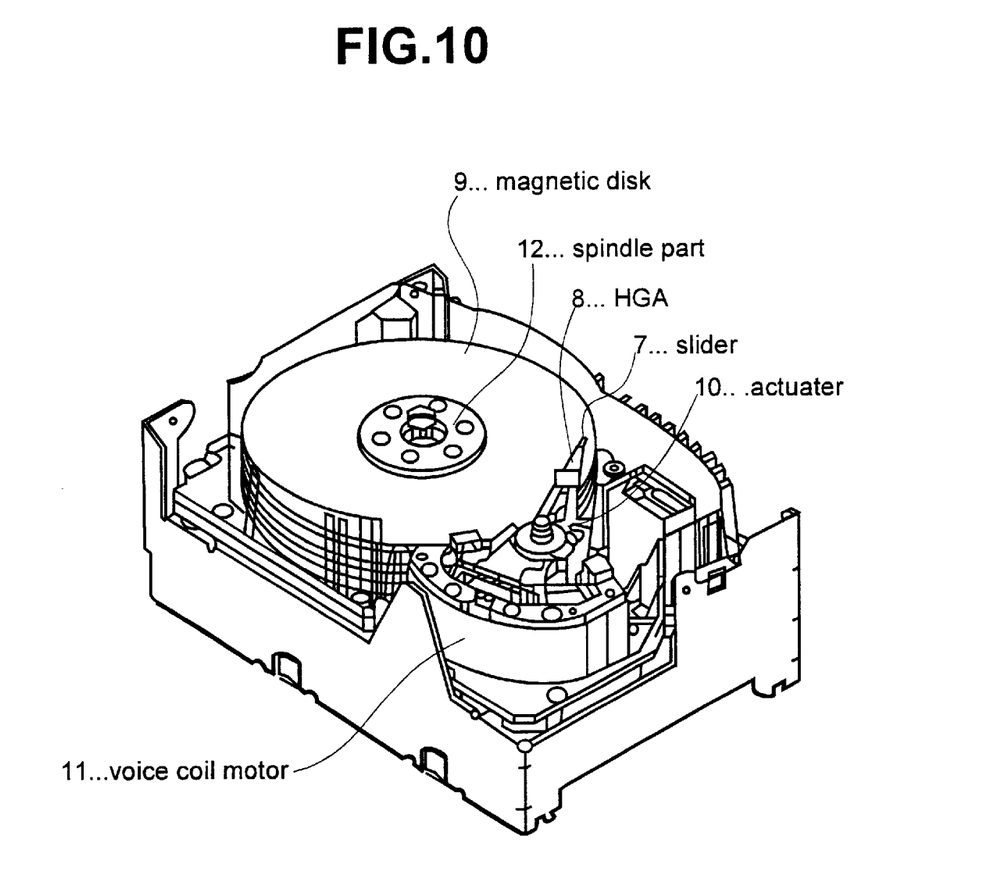
FIG. 10 is a strabismus figure of the magnetic storage of one practical example of this invention.

FIG. 10 is a strabismus figure of the magnetic storage of one practical example of this invention. Magnetic head of each practical example of the superscription was applied to the magnetic disk unit as magnetic storage apparatus. For example, the magnetic head of this invention is applicable for magnetic recorder like magnetic tape unit, etc.

Illustrated magnetic disk unit has discoidal magnetic disk 9 which record data in the record region called a truck on concentric circle as magnetic recording medium. This magnetic disk 9 is supported by spindle division 12, and it is rotated by the drive motor. And, slider 7 with the magnetic head for executing reading and writing of data is supported for HGA8, and actuator 10 makes the magnetic head move for the fixed position on magnetic disk 9. This actuator 10 operates by voice coil motor 11 (in the following, VCM). VCM11 consists of the transfer possible coil put in fixed magnetic field, the coil transfer direction and speed is controlled at the electric signal which is given by the line from control means. The control means controls transmit and receive of data in writing and reading of information, and transfer of actuator 10, etc.

In addition, the operation of this magnetic disk unit is explained in detail. It is accessed to the fixed position where data as a purpose is recorded by moving the slider 7 in the disk surface, while magnetic disk 9 rotates.

By the rotation of magnetic disk 9, air bearing by the air flow occurs under operation of the magnetic disk unit between slider 7 and disk surface, and it makes slider 7 to flow from surface of magnetic disk 9. Therefore, by this air bearing, slider 7 does not touch the magnetic disk surface under operation of the magnetic disk unit, and keep the fixed interval with the magnetic disk 9.

Generally, the control means is composed of logic circuit, memories and microprocessors, etc. Then, the control means conducts on control signal through each line transmission and reception, and it controls various composition means of magnetic disk apparatus. For example, the motor uses the line as medium, and it is controlled according to transmitted motor drive signal. The actuator is controlled so that the chosen slider 7 may transfer optimally and position to the data truck as a purpose on the relating magnetic disk 9 by head position control signal and seek control signal through the line.

Then, control means receives and deciphers the electric signal which converted data of magnetic disk 9 by magnetic head reading, through the line. And, the electric signal for writing in magnetic disk 9 as the data is transmitted through the line to the magnetic head. That is to say, the control means controls transmit and receive of information (data) from reading and writing by magnetic head.

And, above reading and writing signal may be able to travel directly from magnetic head sliders 8. As a control signal, for example, there are access control signal and clock signal, etc. In addition, it is needless to say that the magnetic disk unit may have plurality of magnetic disks and actuators, etc. and the actuators may have plurality of magnetic heads.

As the above be described, according to the magnetic head of this invention, the delay of the change of magnetic field for the change of the writing current is relieved, high speed transfer can be, and it is excellent in the overwriting performance. And, according to the magnetic storage apparatus of this invention, high speed transfer can be, and it is excellent in the overwriting performance.

What is claimed is:

1. A recording and reproducing separation type magnetic head which comprises:

a recording head which writes information on a magnetic disk; and a reproducing head having a magnetic sensor that reads the information from the magnetic disk;

said recording head including an upper core having a tip minute and an upper part, a coil and an upper magnetic film, said upper magnetic film being positioned between the upper core and the magnetic sensor, and being positioned on an opposite side of the upper core across the coil;

wherein the thickness of the upper part of the upper core is less than the thickness of the tip minute of the upper core;

wherein the thickness of the upper core of the region which satisfies W>2×W1 is made to be less than ½ of the thickness of tip minute of the upper core, said W is a dimension of the track width direction of the upper core, and said W1 is a track width of the tip minute of the upper core.

2. A recording and reproducing separation type magnetic head comprising:

a recording head for writing information on a magnetic disk; and a reproducing head having a magnetic sensor for reading the information from the magnetic disk;

said recording head including an upper core having a tip minute and an upper part, wherein the thickness of the upper part of the upper core is less than the thickness of the tip minute of the upper core;

wherein the thickness of the upper core of the region which satisfies W>2×W1 is made to be under ½ of the thickness of tip minute of the upper core, said W is a dimension of the track width direction of the upper core, and said W1 is a track width of the tip minute of the upper core.

* * * * *